(No Model.)

M. L. WILCOX.
REMOVABLE WHEEL.

No. 591,149.  Patented Oct. 5, 1897.

Witnesses:
Ada Gregg
John A Gregg

Melvin L. Wilcox.
Inventor

UNITED STATES PATENT OFFICE.

MELVIN L. WILCOX, OF BAY CITY, MICHIGAN.

REMOVABLE WHEEL.

SPECIFICATION forming part of Letters Patent No. 591,149, dated October 5, 1897.

Application filed August 19, 1896. Serial No. 603,199. (No model.)

*To all whom it may concern:*

Be it known that I, MELVIN L. WILCOX, a citizen of the United States, residing at Bay City, in the county of Bay and State of Michigan, have invented certain new and useful Improvements in Removable Wheels; and I do hereby declare the following to be a full, clear, and exact description of the invention, such as will enable others skilled in the art to which it appertains to make and use the same.

My invention relates to improvements in removable wheels, and while it may be applied to any wheel it is intended more especially for bicycle sprocket-wheels; and it consists in the combination, arrangement, and construction of the parts, with the object of producing a device that may be applied to a sprocket-wheel of a bicycle, so arranged that the sprocket-wheel may be conveniently and easily removed without removing the pedal-crank from its shaft and at the same time artistic in appearance and simple and cheap in its design and manufacture.

Reference is to be had to the accompanying drawings, forming a part of this specification, in which similar numerals of reference indicate corresponding parts in the illustrations.

Figure 1:
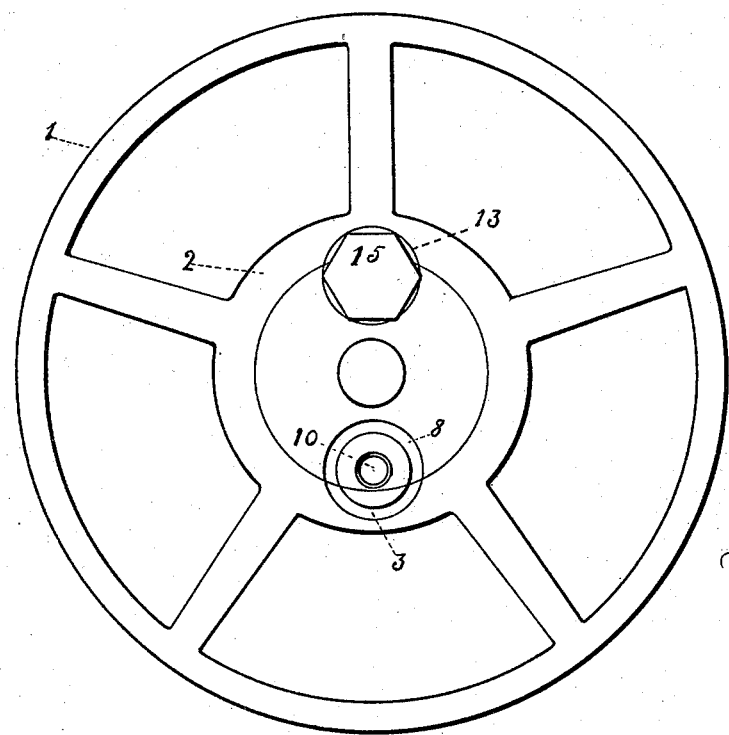
Figure 2:
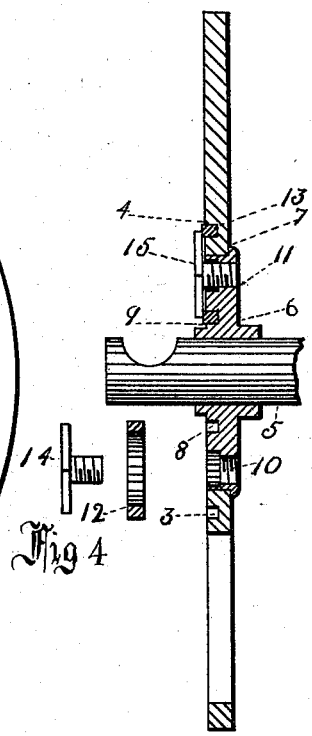
Figure 3:
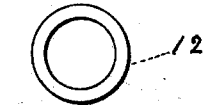

Figure 1 is a perspective view of a wheel, showing the invention, with a part of the fastening device removed. Fig. 2 is a partial section of Fig. 1. Fig. 3 is an annular rim. Fig. 4 is a stud-bolt.

I represents the wheel, and 2 is its hub, and this hub 2 is provided with two arcual grooves 3 and 4, which are formed in its outer face and directly opposite each other.

5 represents the ordinary bicycle pedal-shaft, which is shown broken off.

6 is the shaft-hub, and this shaft-hub is provided with a shoulder 7 on its outer rim and two arcual grooves 8 and 9 provided in its outer face, which are also directly opposite each other, and their radius-centers on the shaft-hub, and concentrically with these grooves are threaded holes 10 and 11.

12 and 13 are annular rings, which are rectangular or square in cross-section.

14 and 15 are threaded stud-bolts, which are provided with polygonal heads.

The hub 2 of the wheel 1 has its inner side fitted to the outer rim of the shaft-hub 6, so as to bring the grooves 3, 4, 8, and 9 in connection with each other and forming annular grooves thereby. The hub 2 of the wheel 1 is placed around the shaft-hub 6 with its back resting against the shoulder 7. The annular rings are then placed in the grooves. The stud-bolts 14 and 15 are then screwed into the threaded holes, with their polygonal heads firmly seated upon the annular rings, as shown at 13, Fig. 1, whereby the wheel is firmly secured to the shaft-hub.

When removing the wheel from the shaft-hub, it is only necessary to remove the stud-bolts 14 and 15, which releases the annular rings 12 and 13, whereby they may be easily removed, which releases the wheel-hub from the shaft-hub, and by the wheel-hub being of an enlarged diameter provides means that the sprocket-wheel of a bicycle may be slid over the pedal-crank without the trouble and annoyance of removing the crank from its shaft, which provides a means that when a sprocket-wheel becomes worn or defective from any cause whatsoever it may be conveniently and easily removed and replaced, and by the stud-bolts having their flat heads made polygonal in form provides a more artistic appearance.

Of course it will be understood that the most important feature of the invention is the means for securing the wheel to the hub, and it will be understood that, while I have described and illustrated the annular rims square in cross-section in relation to the grooves, other forms, however, can be used and produce the same effect, so that I do not limit my invention to the precise construction herein described and shown for accomplishing this purpose, and wish it understood that while I have illustrated and described two annular rings and grooves for securing the wheel to the hub I am well aware that three or more may be used and have substantially the same effect.

It is evident that in a case where a wheel was to be secured directly to the shaft the "shaft-hub," as that term is used herein, would be that part of the shaft to which the wheel is attached.

Having thus described my invention, what

I claim, and desire to secure by Letters Patent, is—

1. In a removable wheel, the combination of the shaft and its hub, of a wheel to be attached to the shaft-hub, the hubs having complementary sectors of a ring-shaped groove at adjacent points, and a ring secured in said groove.

2. In a removable wheel the combination of a wheel provided with a hub, said hub provided with arcual grooves formed in its outer face, the shaft-hub, the annular rings, and the stud-bolts provided with polygonal heads, the said shaft-hub provided with a shoulder on the back side of its outer rim and arcual grooves formed in its outer face and threaded holes provided in the radius-centers of the said grooves, substantially as described.

3. In a removable wheel, in combination, a shaft, a hub thereon, a wheel fitting the shaft-hub, the hubs having complementary sectors of a ring-shaped groove at adjacent points, a ring fitting in said groove, serving to prevent rotation of the wheel on the hub, and means for preventing endwise displacement of the wheel on the hub, forming the securing means for the ring.

In testimony whereof I affix my signature in presence of two witnesses.

MELVIN L. WILCOX.

Witnesses:
ADA GREGG,
JOHN A. GREGG.